United States Patent [19]

Schuff

[11] 4,220,478
[45] Sep. 2, 1980

[54] METHOD FOR REMOVING PARTICULATE MATTER FROM A GAS STREAM AND A METHOD FOR PRODUCING A PRODUCT USING THE REMOVED PARTICULATE MATTER

[75] Inventor: Richard W. Schuff, Phoenix, Ariz.

[73] Assignee: Newbery Energy Corporation, Los Angeles, Calif.

[21] Appl. No.: 966,096

[22] Filed: Dec. 4, 1978

[51] Int. Cl.$^2$ .................... C08L 95/00; B03C 3/14
[52] U.S. Cl. .................................. 106/281 R; 55/5; 55/6; 55/73; 55/99; 55/107; 55/138; 55/474; 55/479; 55/DIG. 25
[58] Field of Search .................. 55/5, 6, 14, 107, 73, 55/98, 99, 138, 262, 474, 479, DIG. 25; 422/177; 423/244 A; 106/275, 281 R

[56] References Cited

U.S. PATENT DOCUMENTS

| | | | |
|---|---|---|---|
| 931,515 | 8/1909 | Sprague | 55/474 |
| 1,471,276 | 10/1923 | Nordström | 55/474 |
| 3,928,532 | 12/1975 | Squires | 55/73 |
| 3,933,978 | 1/1976 | Margraf | 55/73 |
| 3,998,933 | 12/1976 | Henderson, Jr. et al. | 55/98 |
| 4,061,476 | 12/1977 | Hölter et al. | 55/99 |
| 4,113,447 | 12/1978 | Bennett et al. | 55/5 |

FOREIGN PATENT DOCUMENTS 2166912  3/1977  Fed. Rep. of Germany .............. 55/97
690628  4/1953  United Kingdom ...................... 55/107

*Primary Examiner*—David L. Lacey
*Attorney, Agent, or Firm*—Cahill, Sutton & Thomas

[57] ABSTRACT

A method for removing particulate matter from a gas stream by injecting charged particles into the gas stream to form a large charged surface area to induce charges on the entrained particulate matter. The injected material may be an adsorbent or an absorbent and may be reactive with the gases in the gas stream. The charged particles contained in the gas stream together with the injected particles are passed through a porous moving bed of media such as silica rock; as a result of the electrical charge as well as inertial impact forces on the respective particles, the particles become attached to the media which is continuously changed after it has captured the fine particulate matter. The media, together with attached sorbent additive and particulate matter, may then be incorporated into a product the manufacture of which generated the particulate matter.

10 Claims, 6 Drawing Figures

METHOD FOR REMOVING PARTICULATE MATTER FROM A GAS STREAM AND A METHOD FOR PRODUCING A PRODUCT USING THE REMOVED PARTICULATE MATTER

The present invention pertains to methods for removing particulate matter from a gas stream; and more particularly, the invention pertains to electrostatic methods for removal of particulate matter entrained in a gas stream.

Air pollution control methods for the removal of fine particulate matter, particularly submicron particles, are not particularly suitable when employed in sizes required for use in large volume processes. The state-of-the-art particulate removal systems experience substantial difficulties attempting to meet strict requirements and regulations imposed by governmental agencies for the removal of such particulate matter. Further, the removal of noxious gases without the accompanying generation of non-disposable wastes also presents significant problems to present industrial gas cleaning systems.

Present fine particulate gas collection systems exhibit poor efficiencies on submicron particle size particulates that must be removed from a gas stream. In those gas streams containing noxious gases such as sulfur dioxide, present systems impose the requirement of a wet or slurry system to remove the noxious gas which therefore exposes the equipment to scaling potential; further, the frequent generation of acid mists when using a wet system creates a difficult collection problem and subjects the equipment to corrosion. The use of fabric filter collectors to capture the particulates presents a fire danger and results in the requirement that temperatures be reduced which may in turn cause temperatures approaching acid dew points. In addition to the approach to acid dew points resulting from the reduced temperature, recoverable heat is lost thereby imposing an additional inefficiency in the process. Such prior art systems also represent extremely high capital costs together with high operation and maintenance costs.

The removal of particulate matter from a gas stream using electrostatic techniques is well known. The use of typical electrostatic techniques combined with systems for the removal of sulfur dioxide are subject to the difficulties described above. Some suggestions have been made regarding the use of granular bed filters of the removal of particulates. See, for example, a discussion of dust deposition published in the *Journal of the Air Pollution Control Association*, volume 28 no. 4, page 354 et. seq., "Dust Deposition and Granular Bed Filters: Theories and Experiments" by G. I. Tardos et al. Suggestion has also been made that such a granular bed be electrified and the gas particles be electrostatically charged such that when the gas containing the particulate matter is passed through the electrified bed the particulate matter adheres thereto. Such electrified bed equipment is discussed in a brochure entitled, *Particulate Control Systems,* published by Electrostatics, Inc. of Woburn, MA. Regardless of the prior art system that is used, a balance is struck between the thoroughness of collection and the difficulties (and therefore costs) created by the collection system.

It is therefore an object of the present invention to provide a method for removing particulate matter from a gas stream by electrostatically charging the particulate matter and collecting the electrostatically charged particles.

It is another object of the present invention to provide a method for removing particulate matter entrained in a gas stream while simultaneously removing noxious gases from the gas stream.

It is still another object of the present invention to provide a method for removing noxious gases from a gas stream by creating a reaction within the gas stream through the introduction of particulate matter into the stream followed by removal of the particulate matter in the stream.

It is still another object of the present invention to provide a method for removing particulate matter from a gas stream by injecting additional charged particulate matter into the gas stream and passing the gas stream through a granular bed.

It is another object of the present invention to provide a method for producing a product by removing particulate matter from a gas stream generated by the process of making said product, and incorporating the removed particulate matter in the product.

These and other objects of the present invention will become apparent to those skilled in the art as the description thereof proceeds.

Briefly, and in accordance with one embodiment of the present invention, a gas such as flue gas from a coal-fired boiler, containing fly ash and sulfur dioxide, is directed to a mixing chamber. A fluidized and electrostatically-charged sorbent material such as nacholite is injected into the gas stream. The nacholite, at the high temperatures encountered in flue gases, combines with the sulfur dioxide to produce sodium sulfate which is charged as a result of the electrostatically-charged injected particles. The injected particles, when injected into the flue gas stream, create a highly charged field or plasma-like environment which the flue gas contacts and with which it is intimately mixed. The uncharged particulate matter in the flue gas becomes charged through contact with the electrostatic field and mixing with the plasma formed by the injected charged particles. The particulate matter, including submicron-size particles, become effectively charged; the gas with the charged particles is then passed through a moving bed granular filter. The particulate matter adheres to the granular material in the bed and passes out from the gas stream; clean gas exiting from the granular bed may then be directed to heat exchange equipment for the recovery of heat therefrom without the deleterious effects of the noxious gases or particulate matter. The granular bed media may then be recycled and the particulate matter adhering thereto separated therefrom using conventional vibratory screen techniques.

The present invention may more readily be described by reference to the accompanying drawings in which.

Figure 1:
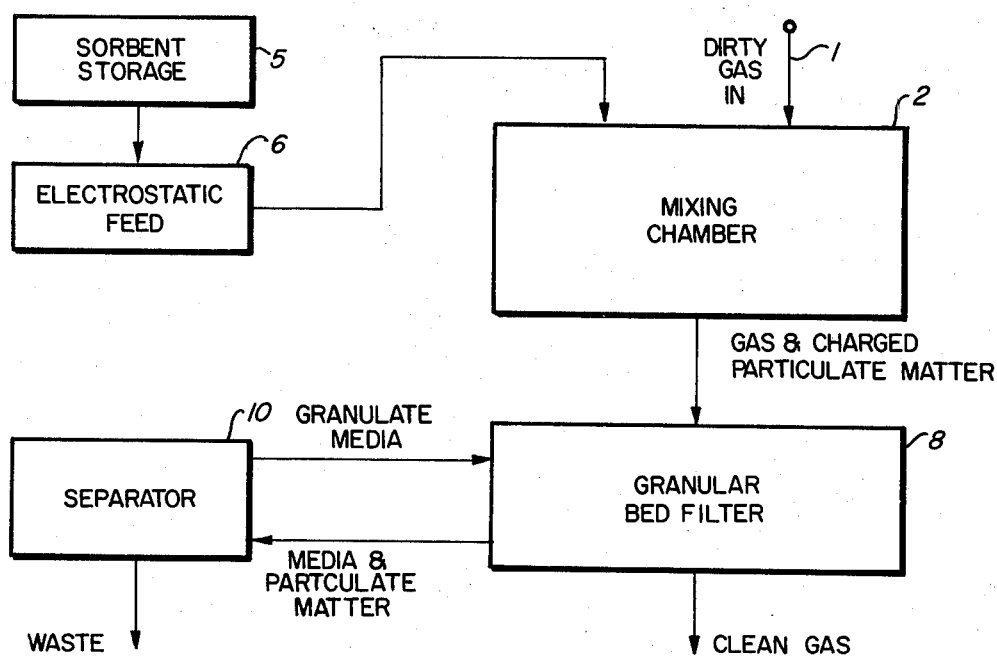
FIG. 1 is a generalized flow diagram of the method of the present invention.

Referring now to FIG. 1, gas containing particulate matter at point 1 is delivered to a mixing chamber 2.

The mixing chamber may, in fact, be simply a duct of an appropriate size and shape for accommodating the passage of the dirty gas. Fine particulate matter is stored in a sorbent storage 5, is electrostatically charged in the electrostatic feed 6 and is introduced into the gas stream in the mixing chamber 2. The sorbent used may be fine absorbent material such as lime or limestone or activated carbon, or may be a particulate that has been recovered from the dirty gas and is being reintroduced into the gas in the mixing chamber. The electrostatically charged fine particulate matter may be introduced into the mixing chamber by using conventional fluidized bed-electrostatic powder coating guns such as those manufactured by Nordson Company of Amherst, Ohio. Such electrostatic powder coating guns are frequently used for powder coating; generally, a fine powder or particulate matter is fluidized and pneumatically fed to a gun using a pneumatic feed. As the powder exits the gun, as electrostatic charge is imparted thereto so that the particles directed from the gun are charged. By directing the electrostatically charged sorbent material into the mixing chamber, the charged particles mix with the dirty gas and provide a large charged surface area which induces charges on the particulate matter contained in the dirty incoming gas.

After the gas is mixed with the electrostatically charged sorbent, the gas and charged particulate matter is fed to a moving porous granular bed filter 8. The media used in the granular bed may be an inert material such as glass beads or silica rock, or may be a material that is to be used in a further process such as a sized product (i.e., cement clinkers, coke, carbon, ore, etc.). As a result of the electrostatic and inertial impact forces, as the gas and charged particulate matter travel through the granular bed filter, the charged particulate matter and unwanted particles attach to the media. The media is continuously circulated and is delivered to a separator 10 which may be a conventional vibratory screening system. The removed material may then be delivered to any convenient waste collection system; the removed particulate may be rescreened to recover particulate matter for use in the mixing chamber 2 as charged particulates. The cleaned granular media is then continuously recirculated to the granular bed filter where it is subjected to the passage of the gas with charged particulate matter therein.

Figure 2:
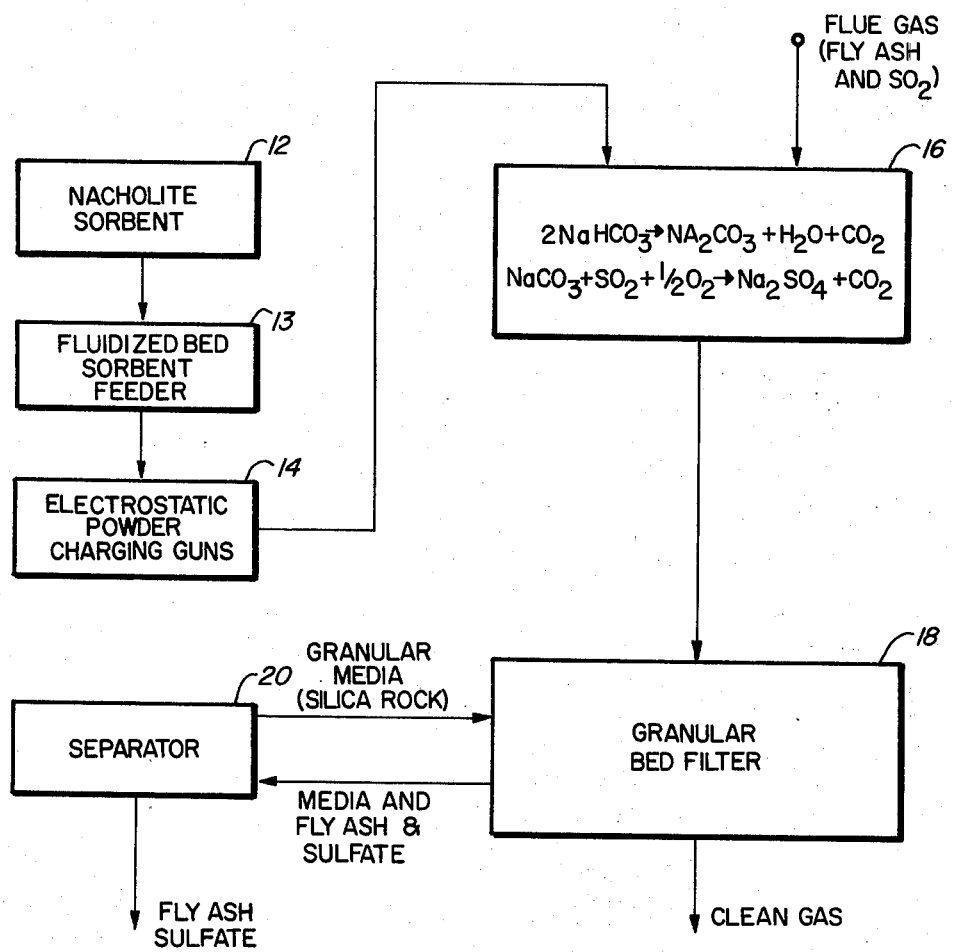
FIG. 2 is a flow diagram of the method of the present invention used in an environment for cleaning flue gas containing fly ash and sulfur dioxide.

The method of the present invention has applicability to many industrial processes. For example, FIG. 2 is a schematic flow diagram of a system incorporating the present method for removing fly ash and sulfur dioxide from flue gas derived from a generating station. When the method is applied to the cleaning of flue gas, and the presence of sulfur dioxide presents the problems of the generation of sulfuric acid, it is possible to remove the sulfur dioxide without the production of acid through the use of the present method. The method incorporates the use of a sorbent such as nacholite. The nacholite is stored as shown at 12; the nacholite is sized to less than 200 mesh. The nacholite is flluidized and electrostatically charged by means of the previously mentioned electrostatic powder charging guns; in FIG. 2, the fluidizaton and the electrostatic charging are shown schematically by flow diagram blocks 13 and 14, respectively. The charged sorbent is injected into the hot boiler exhaust gas stream containing fly ash and sulfur dioxide. While the flue gas and the electrostatically charged powder are shown being mixed at 16, it will be understood that it is not necessary to have a separate mixing chamber. In fact, the electrostatically charged sorbent will generally be injected into the gas stream in available duct without substantial modification although steps may be taken to induce turbulence to insure distribution of the charged sorbent in the gas stream. At the temperatures existing in the hot flue gas, the sulfur dioxide contained in the gas and the sodium bicarbonate of the sorbent combine to form sodium sulfate. The reaction may be shown as follows:

at the temperature of the flue gas

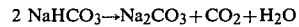

$$2\ NaHCO_3 \rightarrow Na_2CO_3 + CO_2 + H_2O$$

combined with the sulfur dioxide in the flue gas

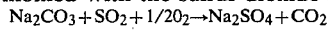

$$Na_2CO_3 + SO_2 + 1/2 O_2 \rightarrow Na_2SO_4 + CO_2$$

The charged sulfate particles and the fly ash particulate matter have now become charged and are delivered to a granular bed filter 18. Silica rock may be used for the media of the granular bed. The charged sulfate particles and fly ash particulates impinge on the granular bed and are separated from the gas stream as the latter flows through the bed. The media with the fly ash and sulfate adhering thereto is continuously recirculated through a vibratory separator 20 which separates the fly ash and sulfate from the media and delivers the media back to the granular bed 18.

Figure 3:
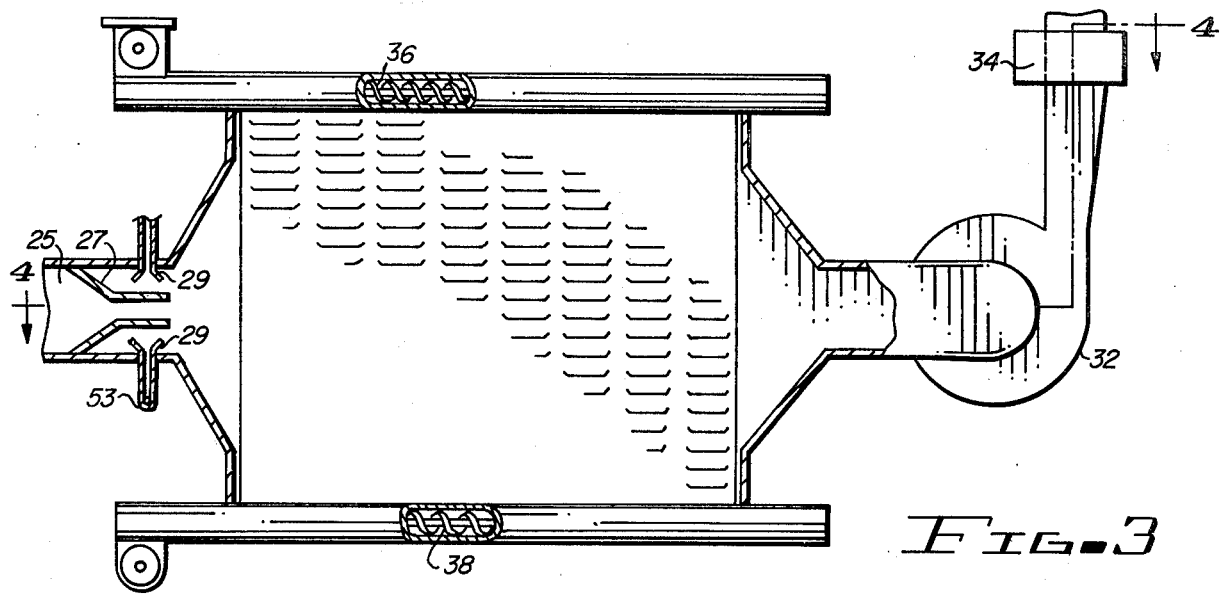
FIGS. 3, 4 and 5 are schematic drawings of apparatus for use in the practice of the method of the present invention.
Figure 4:
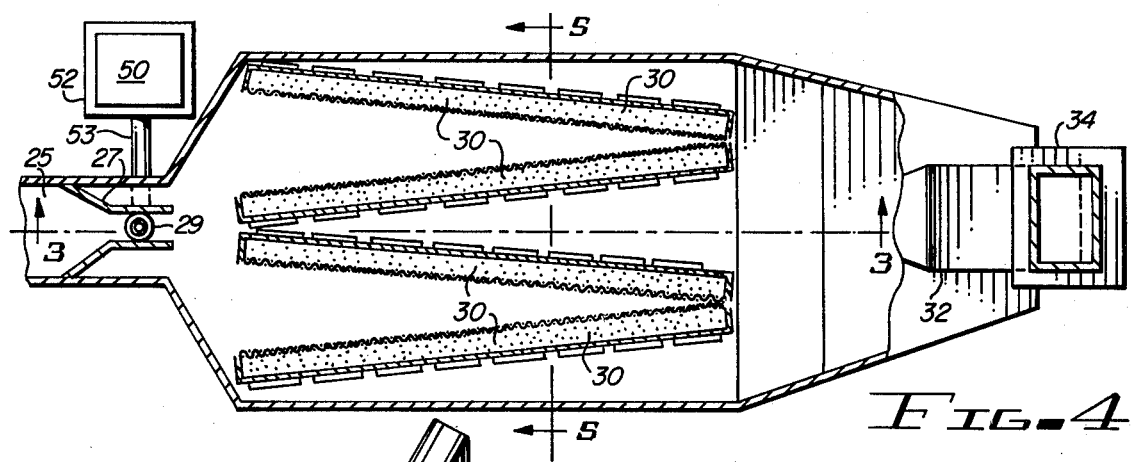
Figure 5:
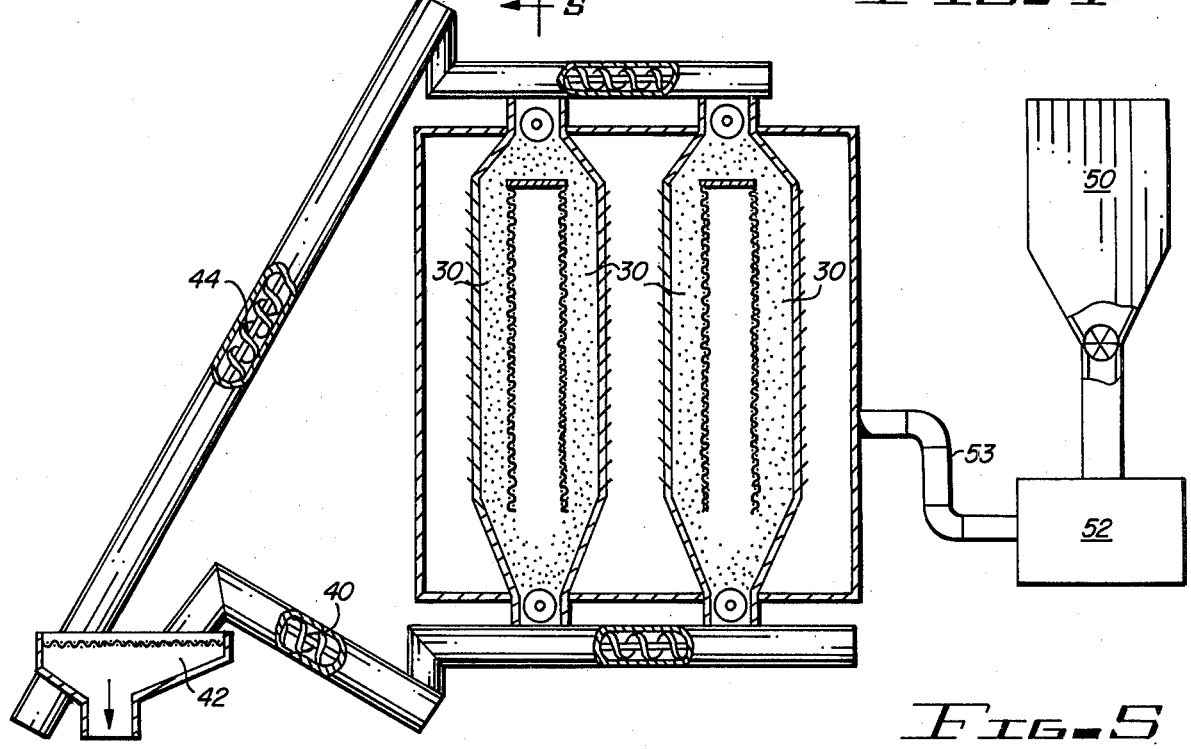

Referring now to FIGS. 3, 4 and 5, a schematic representation of typical apparatus for use in the method of the present invention is shown. Dirty gas is provided to the inlet 25. The gas, for example, may be the above-described flue gas containing fly ash and sulfur dioxide and having a temperature of 600° to 650° F. The gas may be fed through a venturi 27 to create turbulence and provide mixing for the introduction of a charged sorbent such as nacholite. Electrostatic charging guns 29 are positioned to introduce electrostatically charged nacholite particles into the gas stream to create a large charged surface area to induce charges on the particulate matter contained in the dirty incoming gas. The sodium bicarbonate of the nacholite reacts with sulfur dioxide in the dirty gas as described above to form charged sodium sulfate particles. The dirty gas containing the charged fly ash particles and the charged sodium sulfate particles passes through granular filter beds 30. The gas, after passing through the granular beds, is drawn out through an induced draft fan 32. It may be noted that the temperatures of the gas may be maintained in the range of 600° to 650° F. throughout the process and that the clean gases exiting the induced draft fan are therefore at this higher temperature to facilitate heat removal from the gas through a heat exchanger 34. The filter media is passed through the granular beds 30 through the use of a feed screw 36, and is removed from the bottom of the respective beds by similar feed screws 38.

Referring now to FIG. 5, the granular beds 30 are shown in section wherein it may be seen that the granular media is fed to the top of each of the beds while the media upon which the electrostatically charged fly ash and sodium sulfate is attached is removed from the bottom and fed through screw conveyors such as that shown at 40 onto a vibratory screen 42 for separation of the particulate matter from the media. The cleaned media is returned through conveyor 44 to the tops of the media beds 30. The nacholite or sorbent storage hopper 50 provides fine particulate matter to the fluidized bed sorbent feeder 52 to feed the sorbent through feedline 53 to the electrostatic charging guns 29. In a typical flue gas environment, the media may be silica rock sized from 1/16 to 3/16 inches. The distribution of particle sizes of the silica rock may follow a normal distribution curve. The nacholite will generally be very fine and will pass a 200 mesh screen. The vibratory screen separator 42 will typically have slightly less than 1/16 inch openings so that the silica rock media cannot pass therethrough.

For a typical 750 megawatt generating unit, approximately 30,000 pounds per hour of nacholite would be required to react with the sulfur dioxide in the flue gas to reduce the sulfur dioxide content in the gas emitted to atmosphere to 1.2 pounds sulfur dioxide per $10^6$ Btu; the latter value is presently the allowable limit of sulfur dioxide in emissions from generating units. A total waste of approximately 64,000 pounds of sulfate and fly ash would be separated from the granular bed media per hour. Since the reaction between the sorbent and the sulfur dioxide is temperature dependent and the efficiency increases with temperature, the advantage of the present method for cleaning flue gas becomes apparent. If a bag house is to be used as in the prior art, the temperatures of the gases would have to be drastically reduced to below 400° F. for safe bag operation. The total plant heat rate would thus be lower than with the method of the present invention. Further, heat recovery from the flue gas is accomplished in the present system after the gas has been cleaned; since the temperature of the gas during cleaning remains essentially the same, the heat exchangers and induced draft fans are not subjected to abrasive fly ash materials or corrosive materials within the gas.

Figure 6:
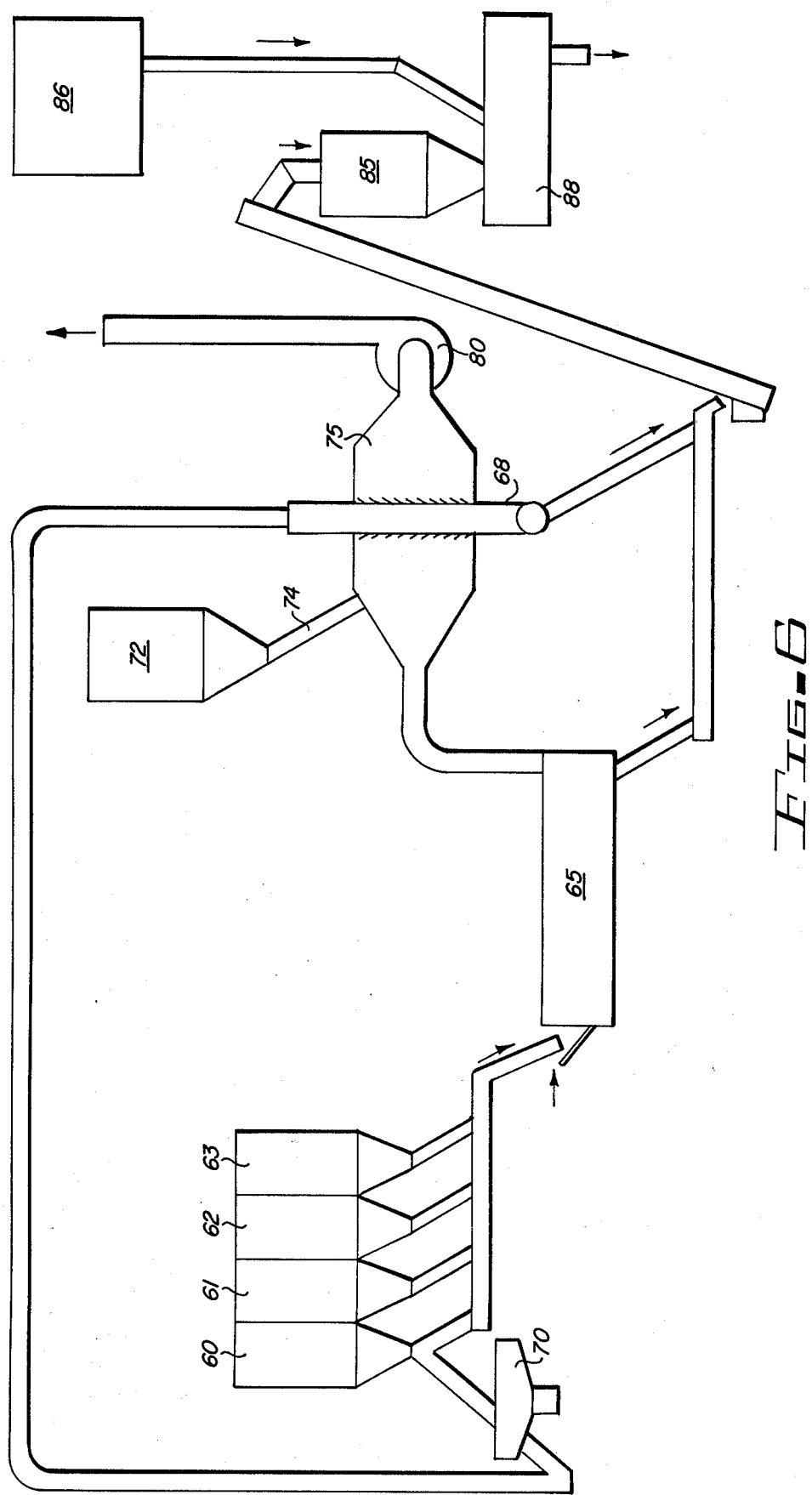
FIG. 6 is a flow diagram, incorporating schematic apparatus, showing the application of the method of the present invention to an asphalt hot plant.

Referring now to FIG. 6, the method of the present invention is shown as it may be applied to an asphalt hot plant. In the production of hot asphalt mix, a predetermined distribution of various sized aggregate is added as well as either lime or cement depending on the characteristics of the raw material used to produce the mix. The various sized aggregates are contained in feed bins 60 through 63 with the former containing the coarse aggregate and the latter containing the finest aggregate. The appropriate proportions of the aggregate are fed to a dryer 65 to which hot combustion air is applied. Since substantial particulate matter such as dust and the like is present in the dried aggregate, and since energy has been utilized to dry such particulate matter, it would be advantageous to recover such particulate matter for reintroduction in the system. Further, such dust cannot be admitted directly to the atmosphere. Accordingly, the air exhaust from dryer 65 is directed to moving granular bed 68 in which the media is derived from the coarse aggregate feed bin 60; the coarse aggregate is passed through a de-dusting screen 70 and fed to the top of the granular bed 68. The lime or cement that is to be added pursuant to the specification requirements for the particular raw material being used, is contained in a hopper 72 and is fed through electrostatic powder charging guns 74 and directed into the chamber 75 in the path of the particulate-containing gas exiting from the dryer 65. The fine electrostatically charged particles of lime or cement mix with the particulate-containing gas from the dryer 65 and induce charges on the particulate.

The electrostatic charged lime or cement particulates and the particulate matter derived from the dryer gas impinges upon and adheres to the media in the moving granular bed filter 68. Since the particulates being removed from the dryer gas and the media from the granular bed filter 68 are both aggregate materials, these materials (which are now dried) may be directly added to the asphalt to produce the appropriate hot mixture. Further, since the sorbent is a desired additive, the sorbent material may also remain with the media and be added to the hot mix. NO recirculation of the sorbent is thus desired or required. The hot gases from the dryer 65 dries or preheats the granular material in the bed 68; further, the effluent from the granular bed is hot and dry and contains aggregate plus additional needed fines as well as the desired additive material. Heat is thus extracted from the gas exiting the drier and the heated fines are recaptured from the gas stream thereby reducing the overall fuel consumption of the hot plant. The cleaned gas exits through an induced draft fan 80. The hot and dried aggregate is then fed to a hopper 85 for subsequent mixture with asphalt from an asphalt storage tank 86 in a pugmill 88.

It may therefore be seen that the method of the present invention has many applications in a variety of industrial processes. The utilization of an absorbent or absorbent material injected into a gas stream provides unexpected advantages. The charged sorbent material provides a large charged surface area which induces charges on the particulate matter contained in the dirty gas entering the field containing the sorbent particules. The charged sorbent particles and charge particulate matter in the dirty gas are then directed to a moving granular bed filter where the particulate matter is removed from the gas stream. The media of the granular filter may be cleaned and recycled; however, the method lends itself to variations in that the material chosen as a sorbent can be reactive with a constituent of the dirty gas. Similarly, the sorbent material may be chosen as an ingredient to be used in a subsequent process when mixed with the media of the granular filter. The material used as the media in the granular filter may comprise a constituent of a process wherein both the sorbent as well as the media, and perhaps even the particulate matter removed from the gas stream, become elements of a resulting product. Regardless of the variation, the result is essentially the same: the dirty gas stream is cleansed of particulate matter even though the particulate matter may be of submicron size; further, the removal of the particulate matter is accomplished at the gas temperature without the requirement for reducing the temperature to accommodate such things as bag fabrics. The method of the present invention requires only dry materials that remain dry therefore negating the corrosive effects of compounds that may be formed as a result of the use of liquids. It will also be appreciated by those skilled in the art that the present method does not require specially designed or sophisticated equipment; all equipment necessary to produce the invention is conventional and is presently available.

I claim:

1. A method for removing particulate matter from a gas stream, comprising:
    (a) directing fluidized sorbent particles through electrostatic charging guns and injecting the charged sorbent particles into a mixing chamber to provide a large charged surface area;
    (b) electrostatically charging said particulate matter by directing said gas stream through said mixing chamber into contact with said charged sorbent particles;

(c) directing said gas, charged particulate matter, and charged sorbent particles through a granular bed of media; and (d) filtering said charged particulate matter and charged sorbent particles by electrostatic attraction and inertial impact with said granular bed.

2. The method set forth in claim 1 including the additional step of continuously removing and replacing media in said granular bed, cleaning the removed media to detach particles and particulate matter therefrom and recirculating the thus cleaned media back to said granular bed.

3. The method of claim 2 wherein said sorbent particles removed from said media are again electrostatically charged and injected into said gas stream.

4. The method of claim 1 wherein said electrostatically charged sorbent particles are reactive with a constituent of said gas stream.

5. The method of claim 4 wherein said sorbent particles are nacholite and said constituent is sulfur dioxide.

6. The method of claim 1 wherein said gas stream is flue gas and said particulate matter is fly ash, and wherein said sorbent particles are nacholite.

7. In a method for producing a product, said product including a granular media and a powder sorbent additive, and wherein said method generates airborne particulate matter to be removed from a gas stream, the improvement comprising the steps:

(a) injecting electrostatically charged powder sorbent additive particles into said gas stream to induce electrostatic charges on said particulate matter;

(b) passing said gas stream, with said electrostatically charged sorbent particles and said particulate matter therein, through a moving bed of said granular media to remove said sorbent particles and particulate matter; and (c) continuously removing said media with attached electrostatically charged sorbent additive and particulate matter for incorporation into said product while continuously replacing said granular media.

8. The improved method of claim 7 wherein said method for producing a product is a method for producing asphalt hot mix, said product is asphalt hot mix, and said granular media is aggregate.

9. The method of claim 8 wherein said powder sorbent additive is one of the materials taken from a group of materials consisting of powdered lime and cement.

10. The method set forth in claim 9 wherein said airborne particulate matter is fines from said aggregate.

* * * * *